US007013146B2

(12) United States Patent
Wang et al.

(10) Patent No.: US 7,013,146 B2
(45) Date of Patent: Mar. 14, 2006

(54) METHOD FOR ADAPTIVELY SETTING TRANSMISSION PARAMETERS FOR A RANDOM ACCESS CHANNEL TRANSMISSION UPLINK PROCEDURE IN A WIRELESS COMMUNICATION SYSTEM

(75) Inventors: Yan Wang, Beijing (CN); Suli Zhao, Beijing (CN); Hao Guan, Beijing (CN)

(73) Assignee: Nokia Corporation, Espoo (FI)

( * ) Notice: Subject to any disclaimer, the term of this patent is extended or adjusted under 35 U.S.C. 154(b) by 133 days.

(21) Appl. No.: 10/481,981

(22) PCT Filed: Jun. 27, 2001

(86) PCT No.: PCT/EP01/07340

§ 371 (c)(1),
(2), (4) Date: Jul. 21, 2004

(87) PCT Pub. No.: WO03/003643

PCT Pub. Date: Jan. 9, 2003

(65) Prior Publication Data

US 2004/0264497 A1 Dec. 30, 2004

(51) Int. Cl.
*H04Q 7/20* (2006.01)

(52) U.S. Cl. ...................... 455/455; 455/63.1; 455/516; 370/465; 370/342

(58) Field of Classification Search ................. 455/455, 455/63.1, 67.11, 516, 522; 370/342, 465
See application file for complete search history.

(56) References Cited

U.S. PATENT DOCUMENTS 6,094,576 A 7/2000 Häkkinen et al.
6,181,686 B1 1/2001 Hämäläinen et al.
6,606,313 B1 * 8/2003 Dahlman et al. ........... 370/347
6,778,835 B1 * 8/2004 You et al. .................... 455/455

FOREIGN PATENT DOCUMENTS

WO WO 98/18280 4/1998
WO WO 200056096 A1 * 9/2000

OTHER PUBLICATIONS

3rd Generation Partnership Project Technical Specification Group Radio Access Network, "*Physical Layer Procedures (FDD)*," Release 1999, 3GPP TS 25.214, version 3.5.0 (Dec. 2000), 47 pages.

3rd Generation Partnership Project, Technical Specification Group Radio Access Network, "*Physical Layer Aspects of UTRA High Speed Downlink Packet Access*," Release 4, 3G TR25.848, version 4.0.0 (Mar. 2001), 90 pages.

3rd Generation Partnership Project, Technical Specification Group Radio Access Network, "*Spreading and Modulation (FDD)*," Release 4, 3G TS 25.213, version 4.0.0 (Mar. 2001), 26 pages.

3rd Generation Partnership Project, Technical Specification Group Radio Access Network, "*Physical Channels and Mapping of Transport Channels onto Physical Channels (FDD)*" Release 1999, 3GPP TS 25.211, version 3.5.0 (Dec. 2000), 45 pages.

* cited by examiner

*Primary Examiner*—Erika A. Gary
(74) *Attorney, Agent, or Firm*—Alfred A. Fressola; Ware, Fressola, Van Der Sluys & Adolphson LLP

(57) ABSTRACT

The present invention provides a method to enhance the RACH message transmission of a wireless communication systems. Therefore the known RACH procedure for uplink transmission is extended by additional steps in order to allow the usage of adaptive transmission parameters for uplink transmissions, preferably the usage of adaptive modulation and coding (AMC). This is advantageous because studies in high-speed downlink packet access show the possibility to increase the data rate of a downlink shared channel. The method according to the invention introduces a new RACH message preamble and enables the base station to estimate suitable adaptive transmission parameters like an AMC setting according to the current transmission conditions which are used during the RACH message transmission.

13 Claims, 1 Drawing Sheet

METHOD FOR ADAPTIVELY SETTING TRANSMISSION PARAMETERS FOR A RANDOM ACCESS CHANNEL TRANSMISSION UPLINK PROCEDURE IN A WIRELESS COMMUNICATION SYSTEM

CROSS REFERENCE TO RELATED APPLICATIONS

This application is for entry into the U.S. national phase under §371 for International Application No. PCT/EP01/07340 having an international filing date of Jun. 27, 2001, and from which priority is claimed under all applicable sections of Title 35 of the United States Code including, but not limited to, Sections 120, 363 and 365(c).

TECHNICAL FIELD

The present invention relates to a method of transmitting user data from a mobile device to a wireless communication system using adaptive transmission parameters in order to enhance the total data rate of the uplink transmission. The present invention also relates to a mobile device using the method of enhanced uplink transmission. More specifically the invention relates to a method for using adaptive modulation and coding for a random access channel transmission uplink procedure in a code division multiple access device.

BACKGROUND OF THE INVENTION

The benefit of adapting the transmission parameters in a wireless system to the changing channel conditions is well known. In fact, fast power control is an example of a technique implemented to enable reliable communications while simultaneously improving system capacity. The process of modifying the transmission parameters to compensate for the variations in channel conditions is known as link adaptation. An implicit link adaptation technique is hybrid automatic repeat request (H-ARQ). There are many schemes for implementing H-ARQ, standardized as H-ARQ, H-AQR type II H-ARQ type III and subtypes used for retransmitting erroneous data wherein re ion is adapted to the transmission conditions depending on the ARQ scheme used for retransmitting. Another technique related to the category of link adaptation is explicit adaptive modulation and coding (AMC) which requires explicit transmission condition m measurements or similar measurements to select the fitting transmission parameters. Link adaptation is also achievable using adaptive selection of antenna which is for example implemented as multiple input multiple output antenna processing.

Adaptive modulation and coding (AMC) is part of the techniques behind the concept of high-speed downlink packet access and is one of the main features introduced by code division multiple access communication services.

The main benefits of AMC are higher data rates which are available for users in favorable positions which in turn increases the average throughput of the cell and reduces interference variations due to link adaptation based on variations in the modulation and/or coding scheme instead of variations in transmission of power. Up to now, AMC is only applied in downlink shared channel (DSCH) to enhance transmission data rates.

Since large data amounts are not only transmitted from a base station to a mobile device designated as downlink transmission but also from a mobile device to a base station designated as uplink transmission it is necessary to apply adaptive transmission parameters to the mobile device. User data are transmitted from the mobile device to the base station using random access channel (RACH) including fixed modulation. Up to now there is no transmission method or procedure known, respectively, to enhance data rate provided by the RACH for users in favorable positions.

The usage of adaptive transmission parameters requires the measurement of the current transmission conditions. Therefore, the measurement has to be performed in a way which ensures obtaining transmission condition data reflecting the conditions during transmission enhanced by the usage of adaptive transmission parameters.

Transmission optimization methods are known in the field of mobile communications. For example WO 98/18280 discloses a mobile communications system which allows for significantly reducing a period of time which is required for establishing a random access mobile-originated call. During establishing a mobile station transmits a random access frame that includes a preamble and a plurality of fields. An initial random access frame is transmitted in a first slot with an initial power level and subsequent random access frames are transmitted in following slots with a power level being of the initial power level increased stepwise by a power level offset. The random access frames are transmitted until the mobile station receives an acknowledgement from the base station. The acknowledgement schedules the mobile-initiated call.

Moreover, U.S. Pat. No. 6,181,686 discloses a method which relates to the optimization of data transfer modes for transmissions in cellular telecommunication systems. The optimization is based on a controlling of the data transfer rate by the means a downlink quality measurement (performed by the mobile station) and an uplink quality measurement (performed by the base station). The quality measurements are performed during data transmission and in case the quality measurements over- or underflow one or more pre-defined threshold value(s) a decision to change the currently employed data transfer mode is provoked. In case of a decision to change a handshake message procedure takes place to instruct the new data transfer mode selected. A number time slots used for data transmission is adapted such that in conjunction with the new data transfer mode having a different data transfer rate substantially constant overall data transmission rate is obtained.

SUMMARY OF THE INVENTION

The object of the present invention is to enhance the total data rate in random access channel uplink transmissions by extending the procedure of a random access channel user data uplink transmission.

The known procedure of a random access channel user data uplink transmission is extended to employ transmission parameters for the transmission of the random access channel message part. Therefore, the procedure has to implement a method to determine the transmission conditions just before the random access channel message part is transmitted.

According to this aspect of the present invention the random access channel procedure is performed as follows: the mobile device randomly selects one of the RACH sub-channels from the group its access class allows it to use and the signature is also selected randomly from among the available signatures, the downlink power level is measured and the initial RACH power level is set with proper margin due to open loop inaccuracy, a RACH preamble (e.g. a 1 ms RACH preamble) is sent including the selected signature, the mobile device decodes acquisition indicator channel (AICH) to determine whether or not the base station has detected the preamble and in case no acquisition indicator (AI) is detected on the AICH the mobile device increases the preamble transmission power by a power ramp step given by the base station (BS), e.g. a multiple of 1 dB, and the preamble is retransmitted in the next available access slot.

The method of the present invention is characterized by the following additional steps. In case an AI transmission is detected on the AICH from the base station, the mobile device transmits a RACH message preamble including transmission conditions related data to enable the use of adaptive transmission parameters for the RACH message part. The RACH message preamble is decoded by the base station and allows the base station to estimate the transmission conditions based on the message preamble. In combination with the current network load and the estimated transmission conditions, the base station is able to determine suitable adaptive transmission parameters allowed for the mobile device. This adaptive transmission parameter setting is transmitted as an indication message to the mobile device via the AICH. The indication message is received by the mobile device and decoded. The mobile device is now able to transmit the RACH message part using the transmitted adaptive transmission parameter setting to increase the total transmission rate.

Preferably, the RACH message preamble includes the data necessary for the transmission parameter setting. Conveniently, the RACH message preamble includes a number for indicating how many transmissions of the RACH preamble are transmitted to the base station before an AI is detected on the AICH. Additionally, the RACH message preamble includes a power ramp step used for transmitting the RACH preambles before the AI is detected on the AICH.

Besides the above described transmission condition data, additional information like antenna system information, speed information of the mobile device and so on are possible. The conditions data which have to be transmitted by mobile device to the base station to estimate the transmission conditions and to determine according adaptive transmission parameters result from the method or procedure of the estimation and determination process.

The way of coding the transmission related data is not limited. The realization of the RACH message preamble can be done in several ways. A certain realization is explained below, wherein the transmission condition related data are coded in a common vector and spread with a RACH preamble signature. This is one possible way. It is also possible to transmit the data in another way. The way of coding the condition related data has to meet the requirement to be decodable by the base station.

More preferably, the RACH message preamble includes the number of RACH preambles transmitted to the base station until an AI is detected on the AICH and the power ramp step used for transmitting the RACH preambles before the AI is detected on the AICH. A possible way to co-code these transmission condition data is modifying the known RACH preamble. The RACH preamble is a complex value sequence including a preamble signature. The preamble signature is chosen to include the transmission condition data and consists of 256 repetitions of a length 16 signature $P_s(n)$, n=0 . . . 15, defined as followed:

$C_{sig,s}(i)=P_s(i \text{ modulo } 16)$, i=0, 1, . . . 4095

The signature $P_s(n)$ is chosen from the set of 16 Hadamard codes of length 16. The number of RACH preambles transmitted to the base station and the power level used for transmission are coded in a value vector B, defined as follows:

$B=(b_m, \ldots, b_0)$, $m \in N, >2$

A certain number of sub-values $b_i$ are reserved for the coding of the number of RACH preamble transmissions, the remaining sub-values are reserved accordingly for the coding of the power level of the transmission. The value vector B is spread with the signature $C_{sig,s}(i)$. The resulting value shall be worded as new signature $\tilde{C}_{sig,s}(i)$. The base station knows $C_{sig,s}(i)$ from the transmission of the last preamble. Therefore, the value vector B can be decoded from the base station and the data regarding the number of RACH preamble transmissions of the mobile device and the power ramp step for transmission of the RACH preambles are available for determining the adaptive transmission parameter setting. All other necessary data like current network load are always available from and by the base station.

As an example, according to the maximal RACH preamble transmissions it is assumed to code a maximal number of 32 RACH preamble transmissions needing 5 bits to be reserved for coding and 3 bits to code the power ramp step. Overall 8 bits will be enough to code both values and the value vector B will be denoted as follows:

$$B = (\underbrace{b_7, b_6, b_5, b_4, b_3}_{\text{number of transmissions}}, \underbrace{b_2, b_1, b_0}_{\text{power level}})$$

The representation $(b_7, b_6, b_5, b_4, b_3)=(0,0,0,0,0)$ means that the RACH preamble was transmitted once, the representation $(b_7, b_6, b_5, b_4, b_3)=(0,0,0,0,1)$ means that the RACH preamble was transmitted twice and so on. Accordingly, the representation of the transmission power level is performed in the same way. The 3 bits enable the representation of 8 different power ramp steps. If the necessity appears to code a larger number of transmissions or more different power ramp steps, the value vector B is easily expandable to serve the necessity according to the example above.

More preferably, the adaptive transmission parameters are parameters to enable the employment of adaptive modulation and coding (AMC) for RACH uplink transmissions.

According to another aspect of the present invention, a computer program for carrying out the method for adaptively setting transmission parameters for a random access channel transmission uplink procedure in a wireless communication system is provided, which comprises program code means for performing all of the steps of the preceding method description when said program is ran on a computer, a network device, a mobile terminal, or an application specific integrated circuit.

According to yet another aspect of the invention, a computer program product is provided comprising program code means stored on a computer readable medium for carrying out the method for adaptively setting transmission parameters of the preceding description when said program product is run on a computer, a network device, a mobile terminal, or an application specific integrated circuit.

According to yet another additional aspect of the present invention, a mobile electronic device is provided, which is adapted to perform a method as described in the foregoing description. The electronic device can be a computer, or a network device such as mobile terminal.

BRIEF DESCRIPTION OF THE DRAWINGS

In the following, the invention will be described in detail by referring to the enclosed drawings in which.

DETAILED DESCRIPTION

Figure 1:
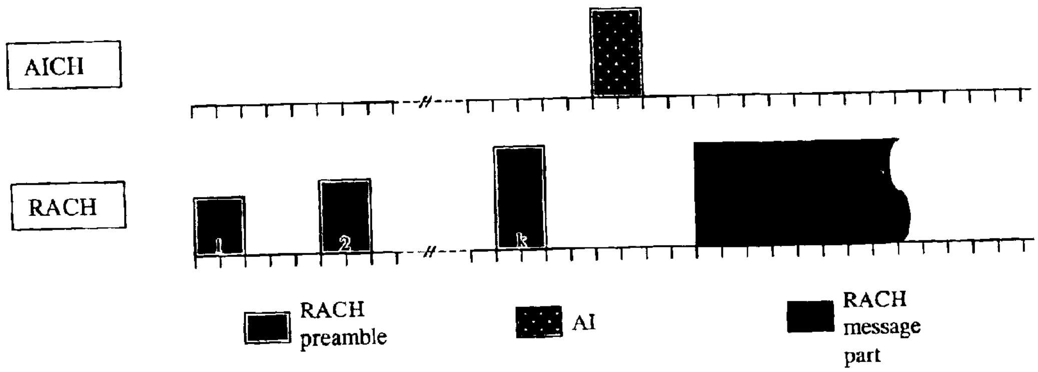
FIG. 1 shows schematically the important steps according to a RACH procedure in 3GPP ($3^{rd}$ Generation Partner Project)

FIG. 1 illustrates the important steps of a standard RACH procedure. Both the RACH and the AICH are shown to illustrate the timely sequence of the transmissions. The procedure is explained in an exemplary way according to the current UMTS standard performed as follows:

1. Available uplink access slots in a next access slot set are derived for a set of available RACH sub-channels within the given access slot class (ASC). One access slot is selected randomly among the ones previously determined. In case of no available access slot an uplink access slot is selected randomly corresponding to the set of available RACH sub-channels within the given ASC from the next access slot set.
2. A signature is selected randomly from the set of available signatures within the given ASC.
3. A preamble retransmission counter is set to a preamble retransmission maximum.
4. A commanded or desired preamble power is set to the initial preamble power level.
5. In case of exceeding the maximum allowed value of the commanded preamble power the preamble transmission power is set to the maximum allowed power. Otherwise the preamble transmission power is set to the commanded transmission power. It is possible that the commanded transmission power is too low in certain situations so that the preamble transmission power has to be set above the commanded transmission power. The preamble is transmitted a first time using the selected uplink slot, signature and preamble transmission power.
6. In case no positive or negative AI corresponding to the selected signature is detected on the AICH downlink access slot corresponding to the selected uplink access slot:
   - 6.1. a next available access slot in the set of available RACH sub-channels within the given ASC is selected.
   - 6.2. a new signature is selected randomly from the set of available signatures within the given ASC.
   - 6.3. The commanded preamble power is increased by a power ramp step. If the commanded preamble power exceeds the maximum allowed power by 6 dB the mobile device passes an error message and exits the random access procedure.
   - 6.4. The preamble retransmission counter is decreased by one.
   - 6.5 The steps beginning with step 5 are repeated if the preamble transmission power is greater than zero. Otherwise the mobile device passes an error message and exits the random access procedure.
7. In case of detecting a negative AI corresponding to the selected signature in the AICH downlink access slot to the selected uplink access slot the mobile device passes an error message and exits the random access procedure.
8. The random access message is transmitted three or four uplink access slots after the uplink access slot of the last transmitted preamble. The transmission power of the message is chosen according to the transmission power under consideration of further parameters of the transmitted preamble.
9. The mobile device passes a confirmation message and exits the random access procedure.

Figure 2:
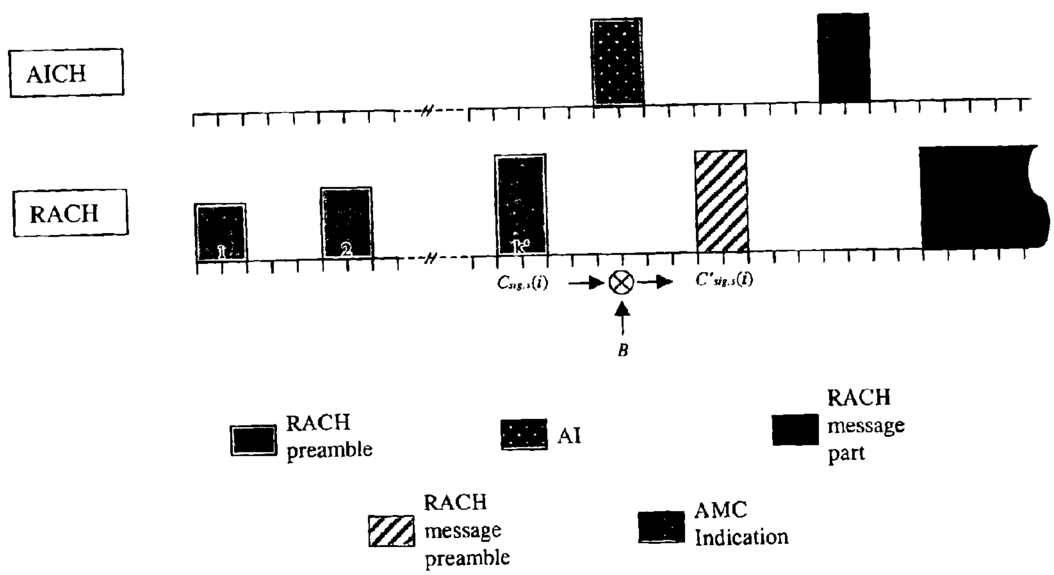
FIG. 2 shows schematically the important steps according to the method of the present invention.

FIG. 2 illustrates the steps according to one aspect of the method of the present invention. The procedure is similar or analagous to the procedure described in FIG. 1 up to the point of receiving the AI by the mobile device (see step 7). As a next step the new signature is derived from the signature $C_{sig,s}(i)$ included in the last transmitted RACH preamble and the value vector B which includes the necessary transmission related data used for determining the AMC setting. Preferably, the value vector B is spread with the RACH preamble signature $C_{sig,s}(i)$ in order to gain the new signature $C_{sig,s}(i)$. The new signature is included in the RACH message preamble and transmitted to the base station. The base station decodes the message preamble to extract the value vector B and determines in combination with base station internal data related to the channel conditions the AMC setting. This setting is transmitted in the form of an AMC indication via the AICH. The mobile device accepts the AMC settings and transmits the RACH message part using the current AMC to improve the data rate and reduce transmission errors.

The scheme is not limited to CDMA. It can be also used in other systems, like TDMA. In other systems, the value vector B can also be sent in a way without spreading. The contents of value vector B will not be limited to the number of transmission, power ramp step, etc. It can contain any transmission related information. Also here only adaptive modulation and coding for message part is mentioned. However, other adaptive transmission parameters for message part can also be used. The scheme keeps the merits of AMC, which means users in favorable positions e.g. users close to the cell site are typically assigned higher order modulation with higher code rates, while users in unfavorable positions e.g. users close to the cell boundary, are assigned lower order modulation with lower code rates. Furthermore, the scheme is an adaptive fast access scheme, it can use system margin as much as possible and as soon as possible, thus increase system throughput.

What is claimed is:

1. A method for using adaptive transmission parameters for a random access channel (RACH) transmission uplink, comprising the steps of:

selecting randomly one of available random access channel (RACH) sub-channels, selecting randomly an available signature ($C_{sig,s}(i)$), setting an initial random access channel (RACH) power level, estimated by a downlink power level, with a margin, transmitting a random access channel (RACH) preamble with said random access channel (RACH) power level including said selected signature, decoding an acquisition indicator (AI) on an acquisition indicator channel (AICH) to determine whether or not a base station has detected said random access channel (RACH) preamble, in case no acquisition indicator (AI) on said acquisition indicator channel (AICH) is detected: increasing said power level and retransmitting said random access channel (RACH) preamble with a new random access channel (RACH) power level increased at a power ramp step, characterized by the additional step of:

in case said acquisition indicator (AI) on said acquisition indicator channel (AICH) is detected: transmitting a random access channel (RACH) message preamble including transmission conditions related data to enable a usage of adaptive transmission parameter setting for the random access channel (RACH) message part transmission; wherein said transmission conditions related data includes a number of random access channel (RACH) preambles transmitted to said base station until said acquisition indicator (AI) is detected on said acquisition indicator channel (AICH) and includes said power ramp step used for transmitting said random access channel (RACH) preambles before said acquisition indicator (AI) is detected on said acquisition indicator channel (AICH), receiving an indication message on said acquisition indicator channel (AICH), wherein said indication message contains an adaptive transmission parameter setting; and using said adaptive transmission parameter setting for transmitting said message part of said random access channel (RACH) transmission.

2. A method according to claim 1, wherein said random access channel (RACH) message preamble includes channel condition related data.

3. A method according to claim 2, wherein said random access channel (RACH) message preamble consists of 256 repetitions of a length 16 signature $P_s(n)$, n=0 . . . 15, defined as follows:

$C_{sig,s}(i)=P_s(i \text{ modulo } 16),\ i=0, 1, \ldots, 4095$ and a value vector B, defined as followed:

$B=(b_m, \ldots, b_0),\ m \in N,\ m>2,$ is spread with the signature $C_{sig,s}(i)$ to form said new signature $C'_{sig,s}(i)$;

wherein said signature $P_s(n)$ is chosen from a set of 16 Hadamard codes of length 16 and said value vector B codes said transmission conditions related data;

wherein a certain number of sub-values $b_i$ are reserved for said coding of said number of random access channel (RACH) preamble transmissions and said remaining sub-values are reserved for coding said power ramp step;

wherein said new signature $C'_{sig,s}(i)$ is used for said random access channel (RACH) message preamble including said transmission conditions related data.

4. A method according to claim 3, wherein said adaptive transmission parameter setting includes an adaptive modulation and coding setting.

5. A computer program product comprising program code means stored on a computer readable medium for carrying out the method of claim 4 when said program product is run on a computer, a network device, a mobile device, or an application specific integrated circuit.

6. A computer program product comprising program code means stored on a computer readable medium for carrying out the method of claim 3 when said program product is run on a computer, a network device, a mobile device, or an application specific integrated circuit.

7. A method according to claim 2, wherein said adaptive transmission parameter setting includes an adaptive modulation and coding setting.

8. A computer program product comprising program code means stored on a computer readable medium for carrying out the method of claim 2 when said program product is run on a computer, a network device, a mobile device, or an application specific integrated circuit.

9. A computer program for executing a method for using adaptive transmission parameters for a random access channel (RACH) transmission uplink, comprising program code means for carrying out the steps of claim 1 when said program is run on a computer, a network device, a mobile device, or an application specific integrated circuit.

10. A computer program product comprising program code means stored on a computer readable medium for carrying out the method of claim 1 when said program product is run on a computer, a network device, a mobile device, or an application specific integrated circuit.

11. An electronic device for wireless communication systems, comprising means adapted to perform a method according to claim 1.

12. A method according to claim 1, wherein said random access channel (RACH) message preamble consists of 256 repetitions of a length 16 signature $P_s(n)$, n=0 . . . 15, defined as follows:

$C_{sig,s}(i)=P_s(i \text{ modulo } 16),\ i=0, 1, \ldots, 4095$ and a value vector B, defined as followed:

$B=(b_m, \ldots, b_0),\ m \in N,\ m>2,$ is spread with the signature $C_{sig,s}(i)$ to form said new signature $C'_{sig,s}(i)$;

wherein said signature $P_s(n)$ is chosen from a set of 16 Hadamard codes of length 16 and said value vector B codes said transmission conditions related data;

wherein a certain number of sub-values $b_i$ are reserved for said coding of said number of random access channel (RACH) preamble transmissions and said remaining sub-values are reserved for coding said power ramp step;

wherein said new signature $C'_{sig,s}(i)$ is used for said random access channel (RACH) message preamble including said transmission conditions related data.

13. A method according to claim 1, wherein said adaptive transmission parameter setting includes an adaptive modulation and coding setting.

* * * * *